US007944910B2

(12) United States Patent
Umeda

(10) Patent No.: US 7,944,910 B2
(45) Date of Patent: May 17, 2011

(54) INK CARTRIDGES AND SYSTEMS HAVING SUCH INK CARTRIDGES

(75) Inventor: Takaichiro Umeda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 796 days.

(21) Appl. No.: 11/965,418

(22) Filed: Dec. 27, 2007

(65) Prior Publication Data

US 2008/0198210 A1 Aug. 21, 2008

(30) Foreign Application Priority Data

Feb. 19, 2007 (JP) ................................ 2007-037848

(51) Int. Cl.
*H04L 12/66* (2006.01)
*B41J 2/175* (2006.01)

(52) U.S. Cl. ............ 370/352; 281/42; 310/328; 347/86; 359/820; 720/607

(58) Field of Classification Search ................ 347/7, 19, 347/49, 85, 86, 87; 281/42; 359/820; 370/352; 720/607
See application file for complete search history.

(56) References Cited

U.S. PATENT DOCUMENTS 5,448,274 A * 9/1995 Hirabayashi et al. ........... 347/86
5,512,926 A * 4/1996 Uchikata et al. ................ 347/86
5,760,976 A * 6/1998 DeLaMatyr et al. .......... 359/820
6,036,305 A * 3/2000 Nagasaki et al. ............... 347/86
6,386,681 B1 5/2002 Askren et al.
6,488,369 B1 12/2002 Steinmetz et al.
7,121,655 B2 10/2006 Silverbrook
7,188,939 B1 3/2007 Sasaki
7,640,556 B2 * 12/2009 Oota ............................. 720/607
7,690,773 B2 * 4/2010 Hattori et al. ................... 347/86
7,753,505 B2 * 7/2010 Sugahara et al. ............... 347/86
2002/0063759 A1 5/2002 Hirano et al.
2004/0262908 A1 * 12/2004 Nobata ........................... 281/42
2005/0068382 A1 3/2005 Kimura et al.
2007/0126818 A1 6/2007 Hibbard et al.

(Continued)

FOREIGN PATENT DOCUMENTS

DE 20316502 U1 2/2004

(Continued)

OTHER PUBLICATIONS

European Patent Office, Partial European Search Report for Related EP Application No. 08003698 dated Jun. 10, 2008.

(Continued)

*Primary Examiner* — Gerald Gauthier
(74) *Attorney, Agent, or Firm* — Baker Botts L.L.P.

(57) ABSTRACT

An ink cartridge includes a case, an ink supply portion, an air intake portion, and at least one resilient member. The ink supply portion is positioned at a front face of the case, and the ink supply portion is configured to dispense ink from an interior of an ink chamber to an exterior of the ink chamber. The air intake portion is configured to draw air into the ink chamber. The at least one resilient member has a first portion positioned at the front face of the case and a second portion which is positioned a predetermined distance away from the front face of the case in a predetermined direction away from the ink chamber. The resilient member extends from the front face of the case further than the ink supply portion in the predetermined direction.

14 Claims, 16 Drawing Sheets

U.S. PATENT DOCUMENTS

| | | | |
|---|---|---|---|
| 2007/0229615 A1 | 10/2007 | Hattori et al. | |
| 2008/0198210 A1* | 8/2008 | Umeda | 347/86 |
| 2010/0176689 A1* | 7/2010 | Elhayani et al. | 310/328 |

FOREIGN PATENT DOCUMENTS

| | | | |
|---|---|---|---|
| EP | 1053875 | A1 | 11/2000 |
| EP | 1190861 | A1 | 3/2002 |
| EP | 1219448 | A2 | 7/2002 |
| EP | 1300247 | A2 | 4/2003 |
| EP | 1462263 | A2 | 9/2004 |
| EP | 1637332 | A1 | 3/2006 |
| EP | 1792737 | A2 | 6/2007 |
| EP | 1834788 | A1 | 9/2007 |
| JP | 2005238815 | A | 9/2005 |
| JP | 2006159707 | A | 6/2006 |

OTHER PUBLICATIONS

European Patent Office, European Search Report for Related EP Application No. 08003698 dated Oct. 1, 2008.

* cited by examiner

INK CARTRIDGES AND SYSTEMS HAVING SUCH INK CARTRIDGES

The present application claims priority from Japanese Patent Application No. JP-2007-037848, which was filed on Feb. 19, 2007, the disclosure of which is incorporated herein by reference in its entirety.

BACKGROUND OF THE INVENTION

1. Field of the Invention

The present invention relates to ink cartridges configured to dispense ink onto a recording medium when mounted in an ink jet printer, and systems which use such ink cartridges.

2. Description of Related Art

A known inkjet recording system includes an inkjet recording apparatus and a plurality of ink cartridges which are mounted side by side to a mounting portion of the inkjet recording apparatus. An ink supply opening is formed at one surface of the ink cartridge, and an ink supply needle is provided in the inkjet recording apparatus and is inserted through the ink supply opening when the ink cartridge is mounted to the inkjet recording apparatus, which causes ink within the ink cartridge to be supplied to inkjet recording apparatus. The ink cartridge includes a case and a bag disposed within the case. The bag has a port for supplying ink within the bag to the outside of the bag, and the port is aligned with the ink supply opening. A lid, a valve, and a spring are positioned within the port, such that the spring urges the valve to contact the lid. Specifically, when the valve contacts the lid, fluid communication between the inside of the bag and the outside of the ink cartridge is prevented, and when the ink supply needle applies a predetermined amount of force to the valve greater than and against the urging force of the spring, the valve separates from the lid, and the inside of the bag and the outside of the ink cartridge are in fluid communication with each other.

Ink may adhere to the ink supply needle after the ink supply needle is inserted into the ink cartridge through the ink supply opening. The ink which adheres to the ink supply needle adheres adjacent to the ink supply opening when the ink cartridge is removed from the mounting portion. The ink may drip from the ink supply opening or the needle, or both, onto the mounting portion. When the ink drips onto the mounting portion, the mounting portion becomes dirtied. After the mounting portion is dirtied, when a new ink cartridge is mounted to the mounting portion, the new ink cartridge also may become dirtied. When the new ink cartridge is removed from the mounting portion, a hand of user also may become dirtied with ink. Moreover, when the ink supply needle is removed from the ink supply opening, the spring pushes the valve back toward the ink supply opening. Therefore, ink is pushed by the valve toward the ink supply opening, and a relatively large amount of ink may be pushed out of the ink supply opening.

Another known ink cartridge includes an ink supply portion protruding from one surface of the ink cartridge. An ink supply opening is formed at the end of the ink supply portion. Ink also may drip from the ink supply opening of this type of ink cartridge onto a mounting portion of an inkjet recording apparatus.

Yet another known ink cartridge is configured to be mounted to a mounting portion of another known recording apparatus, and the mounting portion includes a door which is configured to be opened and closed. After this known ink cartridge is mounted to the mounting portion and the door is closed, the door is configured to latch on to the ink cartridge to remove the ink cartridge from the mounting portion when the door is opened by a user, which increases the ease with which the ink cartridge may be removed from the mounting portion. Nevertheless, the user relies on the recording apparatus to remove the ink cartridge from the recording apparatus.

SUMMARY OF THE INVENTION

Therefore, a need has arisen for ink cartridges which overcome these and other shortcomings of the related art. A technical advantage of the present invention is that the ink cartridge may prevent ink from dripping from the ink cartridge or reduce an amount of ink which drips from the ink cartridge. Another technical advantage of the present invention is that the ink cartridge readily may be removed from the recording apparatus.

According to an embodiment of the present invention, an ink cartridge comprises a case, an ink supply portion, an air intake portion, and at least one resilient member. The case comprises a front face and a rear face opposite the front face. The case has at least a portion of an ink chamber defined therein, and the ink chamber is configured to store ink therein. The ink supply portion is positioned at the front face of the case. The ink supply portion is configured to dispense ink from an interior of the ink chamber to an exterior of the ink chamber, and the air intake portion is positioned at the case. The air intake portion is configured to draw air into the ink chamber. The at least one resilient member has a first portion positioned at the front face of the case, and a second portion which is positioned a predetermined distance away from the front face of the case in a predetermined direction away from the ink chamber. The resilient member extends from the front face of the case further than the ink supply portion in the predetermined direction.

According to another embodiment of the present invention, an ink cartridge comprises a case, an ink supply portion, an air intake portion, and at least one resilient member. The case comprises a front face and a rear face opposite the front face. The case has at least a portion of an ink chamber defined therein, and the ink chamber is configured to store ink therein. The ink supply portion is positioned at the front face of the case. The ink supply portion is configured to dispense ink from an interior of the ink chamber to an exterior of the ink chamber, and the air intake portion is positioned at the case. The air intake portion is configured to draw air into the ink chamber. The at least one resilient member has a first portion positioned at the front face of the case, and a second portion which is positioned a predetermined distance away from the front face of the case in a predetermined direction away from the ink chamber. The resilient member extends from the front face of the case further than the ink supply portion in the predetermined direction. The first portion of the at least one resilient member is unaligned with each of the ink supply portion and the air intake portion in the predetermined direction.

According to yet another embodiment of the present invention, a system comprises an ink cartridge and an inkjet printer. The ink cartridge comprises a case, an ink supply portion, a first conductive coil, and a second conductive coil spring. The case comprises a front face and a rear face opposite the front face. The case has at least a portion of an ink chamber defined therein, and the ink chamber is configured to store ink therein. The ink supply portion is positioned at the front face of the case. The ink supply portion is configured to dispense ink from an interior of the ink chamber to an exterior of the ink chamber. The first conductive coil spring has a first portion positioned at the front face of the case, and a second portion which is positioned a predetermined distance away from the front face of the case in a predetermined direction. The first conductive coil spring is configured to be electrically connected to ink in the ink chamber. The second conductive coil spring has a first portion positioned at the front face of the case, and a second portion which is positioned a predetermined distance away from the front face of the case in the predetermined direction. The second conductive coil spring is configured to be electrically connected to ink in the ink chamber. The inkjet printer comprises a first electric terminal, a second electric terminal, and a determining portion. The first electric terminal is configured to contact the first conductive coil spring. The second electric terminal is configured to contact the second conductive coil spring. The determining portion is configured to determine an amount of ink disposed in the ink chamber based on an electric resistance between the first electric terminal and the second electric terminal.

Other features and technical advantages of the present invention will be apparent to persons of ordinary skill in the art in view of the following detailed description of the invention and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawing.

FIG. 2(*b*) is a partial, side view of the ink cartridge of FIG. 1.

FIG. 3(*b*) is a partial, cross-sectional view of the ink cartridge taken along III-III line in FIG. 2(*a*) and the mounting portion, after the mounting of the ink cartridge to the mounting portion is completed.

FIG. 4(*b*) is a cross-sectional view of the ink cartridge taken along III-III line in FIG. 2(*a*) and the mounting portion, after the mounting of the ink cartridge to the mounting portion is completed and when the amount of ink stored in the ink cartridge is less than a sufficient amount of ink.

FIG. 12(*b*) is a side view of the ink cartridge of FIG. 12(*a*).

FIG. 13(*b*) is a cross-sectional view of the ink cartridge being ejected from the mounting portion of FIG. 13(*a*) when that amount of ink stored in the ink cartridge is less than a sufficient amount of ink.

DETAILED DESCRIPTION OF EMBODIMENTS OF THE INVENTION

Embodiments of the present invention, and their features and advantages, are understood by referring to FIGS. 1-15, like numerals being used for like corresponding parts in the various drawings.

Figure 1:
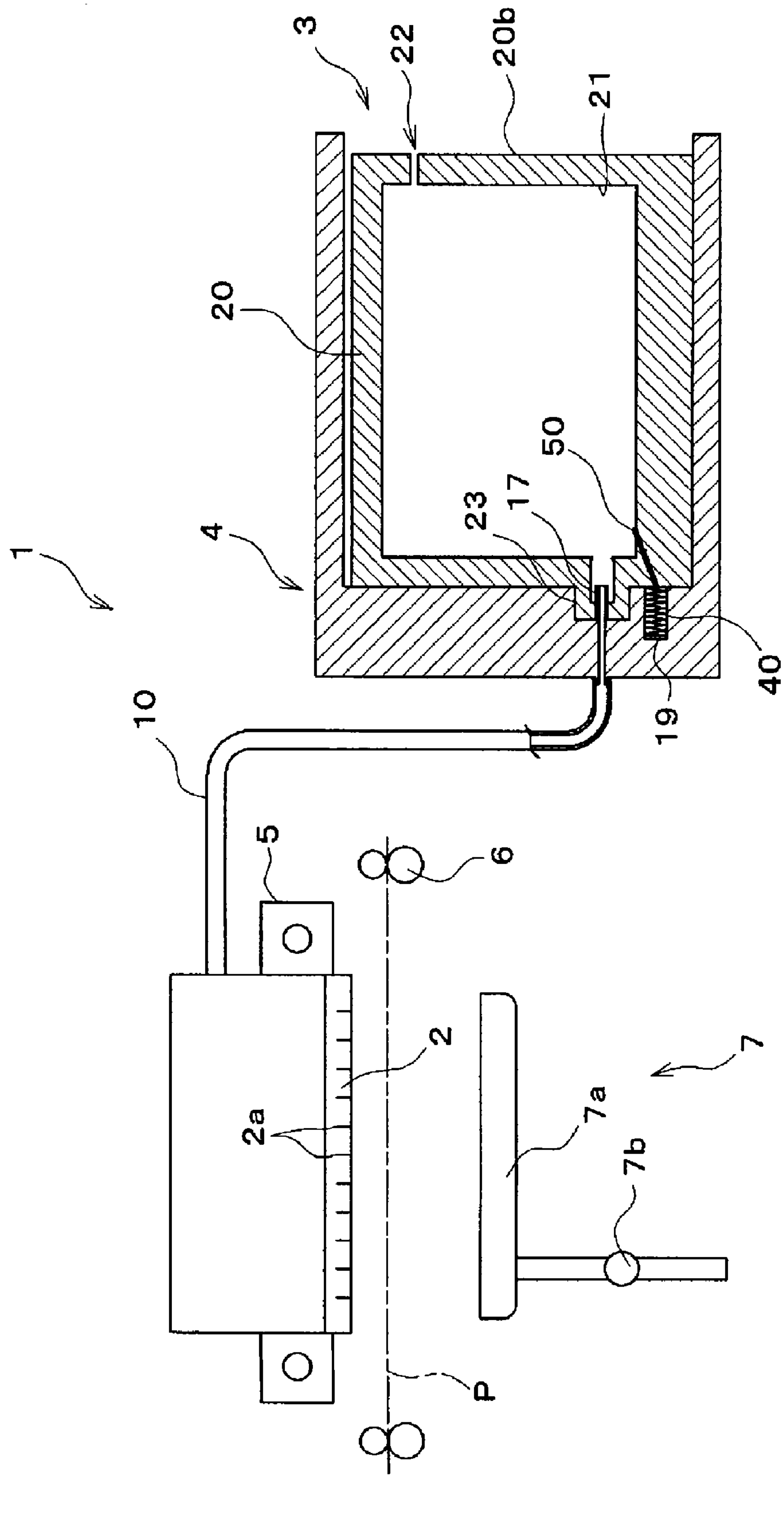
FIG. 1 is a schematic diagram of an inkjet printer and an ink cartridge, according to an embodiment of the present invention.

Referring to FIG. 1, an inkjet printer 1 may comprise an inkjet head 2, a mounting portion 4, a flexible tube 10, a carriage 5, a feeding mechanism 6, and a purge device 7. Inkjet head 2 also may comprise a plurality of nozzles 2*a* configured to eject ink toward a sheet of paper P, and mounting portion 4 may be configured to receive an ink cartridge 3. Inkjet head 2 and ink cartridge 3 may be in fluid communication with each other through tube 10 when ink cartridge 3 is mounted to mounting portion 4. Carriage 5 may be configured to reciprocate with inkjet head 2, feeding mechanism 6 may be configured to feed a sheet of paper P, and purge device 7 may be configured to draw out air or thickened ink from the inside of inkjet head 2.

During a printing operation, inkjet head 2 reciprocates with carriage 5 in a direction which is perpendicular to a paper plane of FIG. 1, and a sheet of paper P is fed by feeding mechanism 6 in a horizontal direction in FIG. 1. Inkjet head 2 faces the sheet of paper P, and the reciprocation of inkjet head 2 and feeding of recording paper P may be synchronized by a controller 8 (See FIG. 5). Each time inkjet head 2 crosses the sheet of paper P, inkjet head 2 ejects ink from nozzles 2*a*, and ink is supplied from ink cartridge 3 through tube 10. Nozzles 2*a* are positioned higher than mounting portion 4 and ink cartridge 3 to prevent ink leakage from nozzles 2*a* when printing is not performed.

Purge device 7 may comprise a cap 7*a* and a pump 7*b*. Cap 7*a* may be configured to selectively move toward and away from an ink-eject surface of inkjet head 2. Nozzles 2*a* may be positioned at the ink-eject surface, cap 7*a* may be configured to cover the ink-eject surface, and pump 7*b* may be configured to draw out ink from nozzles 2*a*. When inkjet head 2 is positioned out of a printable area, cap 7*a* may cover the ink-eject surface and pump 7*b* may draw out air or thickened ink from nozzles 2*a*. The printable area is defined as an area where inkjet head 2 may eject ink toward a sheet of paper P. Evaporation of water from ink may result in thickening ink in nozzles 2*s*, and the purge operation may restore ink-eject performance of inkjet head 2.

Mounting portion 4 opens to the right in FIG. 1. Ink cartridge 3 may be inserted and mounted horizontally into the inside of mounting portion 4 from the opening. An ink cartridge 3 may be removed from mounting portion 4 by pulling out a right edge of ink cartridge 3 to the right in FIG. 1.

Figure 2A:
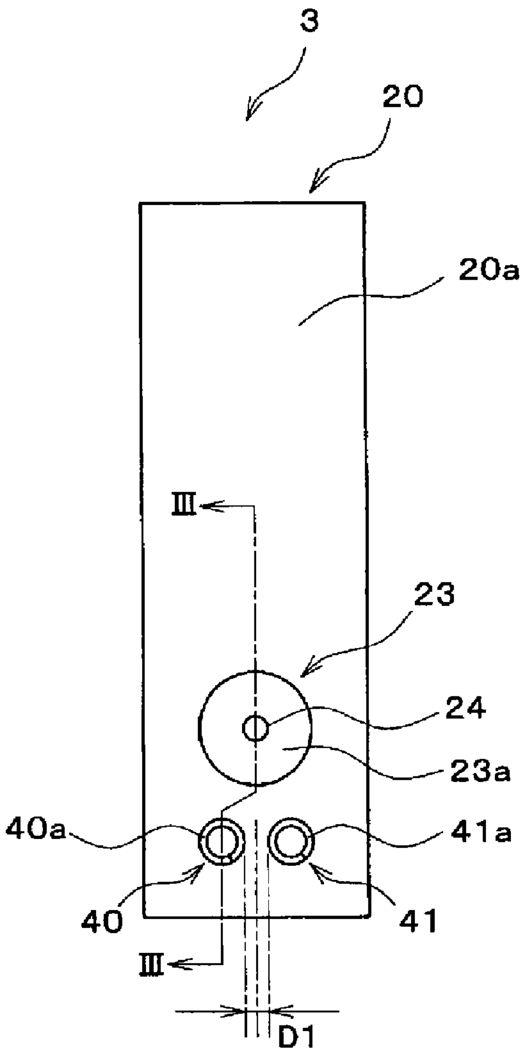
FIG. 2(*a*) is a front view of the ink cartridge of FIG. 1.
Figure 2B:
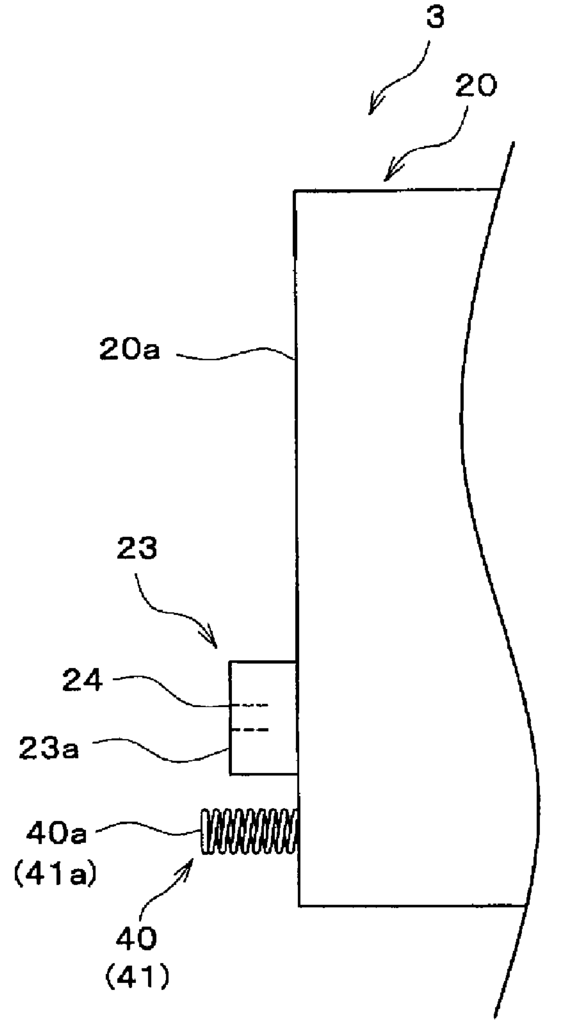
Figure 3A:
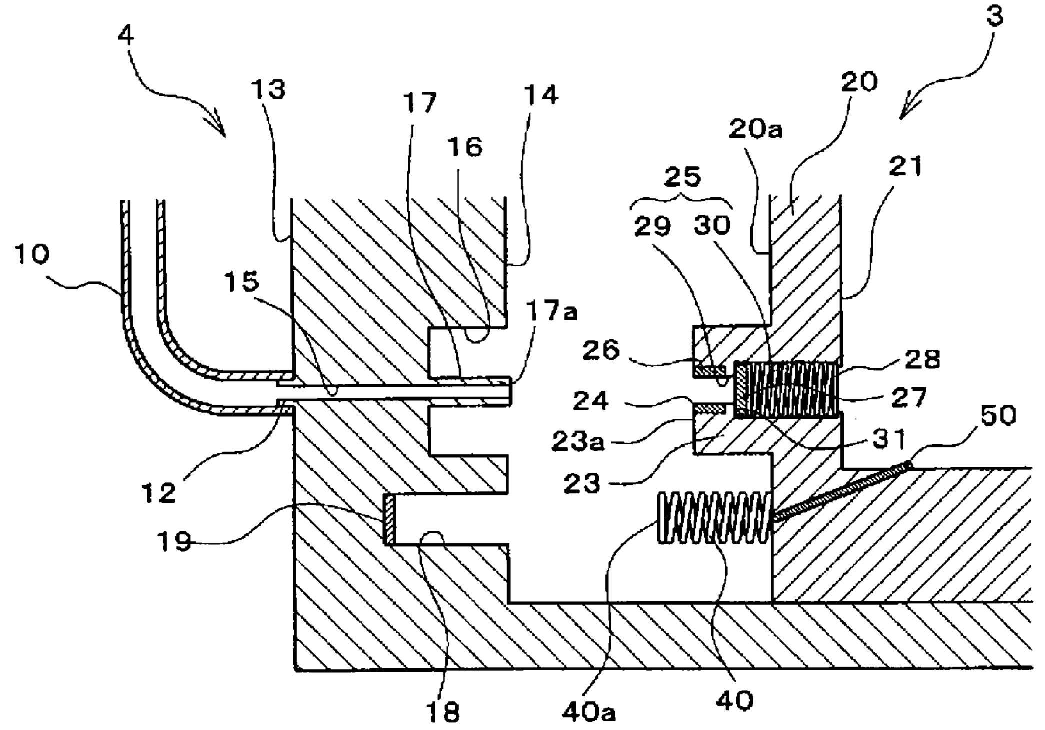
FIG. 3(*a*) is a partial, cross-sectional view of the ink cartridge taken along III-III line in FIG. 2(*a*) and a mounting portion, according to an embodiment of the present invention, just before mounting of the ink cartridge to the mounting portion is completed.
Figure 3B:
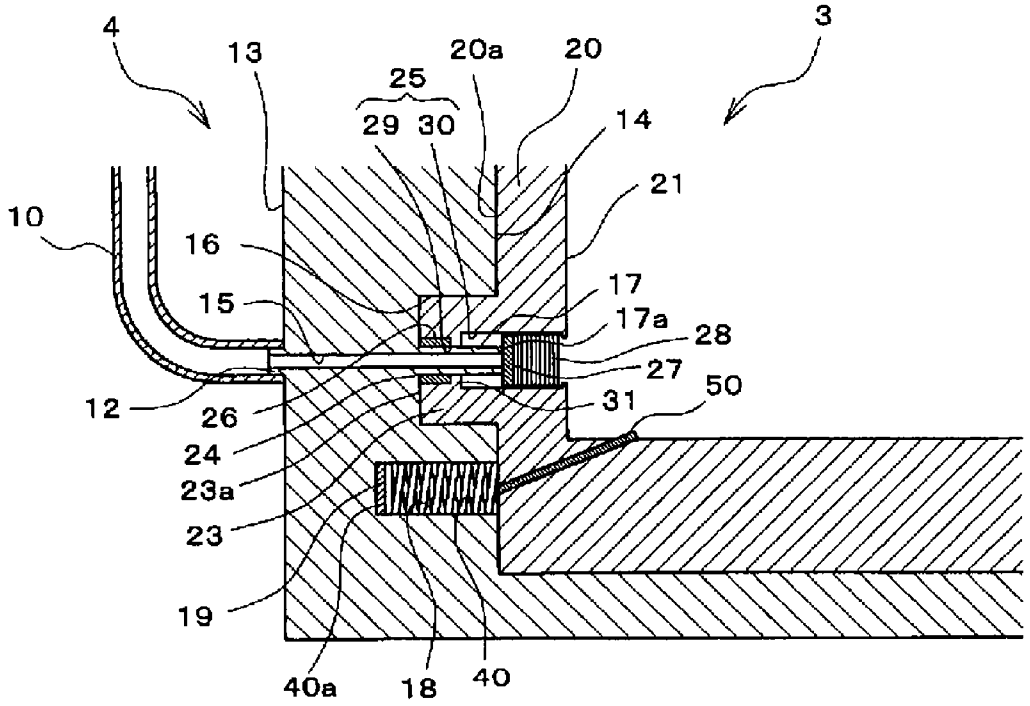
Figure 4A:
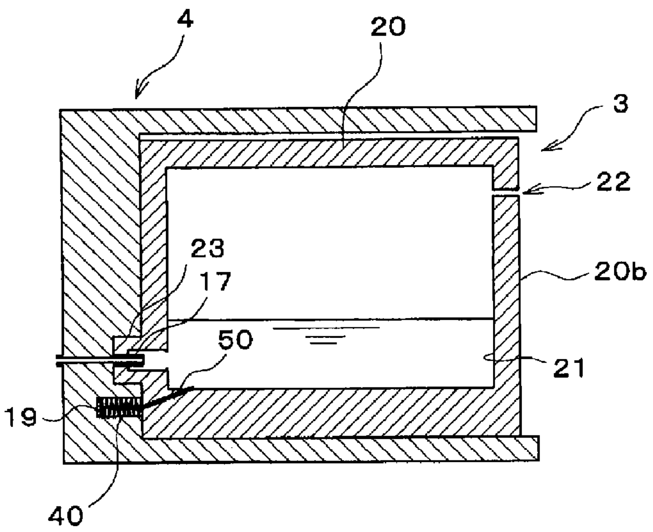
FIG. 4(*a*) is a cross-sectional view of the ink cartridge taken along III-III line in FIG. 2(*a*) and the mounting portion, after the mounting of the ink cartridge to the mounting portion is completed and when a sufficient amount of ink is stored in the ink cartridge.
Figure 4B:
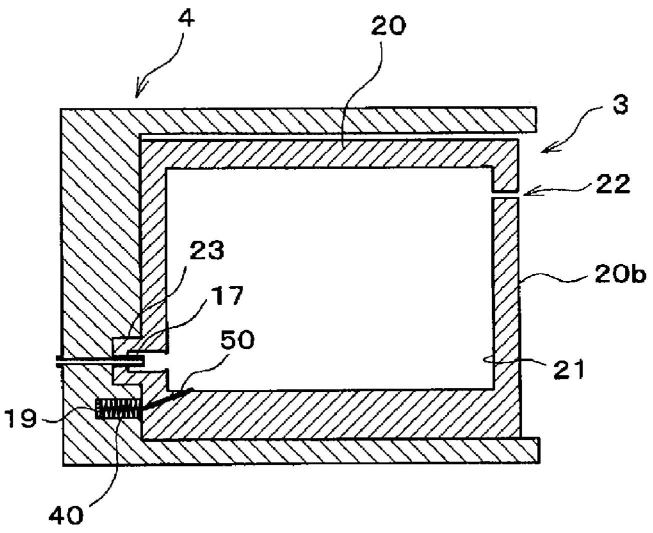

Referring to FIGS. 1-3, ink cartridge 3 may comprise a case 20 storing ink and an ink supply portion 23 configured to supply ink from the interior of case 20 to the exterior of case 20. Case 20 may comprise a front face 20*a*, and when ink cartridge 3 is mounted to mounting portion 4, front face 20*a* faces a closed end surface 14 of mounting portion 4 positioned opposite from the opening of mounting portion 4. Ink supply portion 23 is positioned at front face 20*a*.

Case 20 may have a substantially rectangular parallelepiped shape having front face 20*a*, a rear face 20*b* opposite front face 20*a*, a top face, a bottom face opposite the top face, a right side face, and a left side face opposite the right side face. Each of the top face and the bottom face is connected to front face 20*a* and rear face 20*b*, and each of the right side face and the left side face is connected to front face 20, rear face 20*b*, the top face, and the bottom face. Front face 20*a*, rear face 20*b*, the top face, the bottom face, the right side face, and the left side face may be substantially parallel to its opposing face, and substantially perpendicular to the other faces. Case 20 may have depth between front face 20*a* and rear face 20*b*, height between the top face and the bottom face, and width between the right side face and the left side face. Case 20 may comprise at least one resin material. Case 20 may comprise an ink chamber 21 configured to store ink, e.g., conductive ink comprising coloring agent e.g., dye or pigment, or both. In cartridge 3 is inserted and mounted to mounting portion 4 in a direction parallel to the depth direction of case 20.

Air intake hole 22 may be formed through rear face 20*b*. Air intake hole 22 may be positioned adjacent to the upper end of rear face 20*b*. Before ink cartridge 3 is used, a sticker (not shown) may be adhered to rear face 20*b* to cover air intake hole 22, and fluid communication between the interior of ink chamber 21 and the exterior of the ink chamber 21 via air intake hole 22 is prevented. When a user intends to use ink cartridge 3, the user removes the sticker from rear face 20*b*, and thereby the interior of ink chamber 21 is brought into fluid communication with the exterior of ink chamber 21 via air intake hole 22.

Ink supply portion 23 may have a cylindrical shape and may extend a particular distance from front face 20*a* in the depth direction of case 20 away from ink chamber 21, and ink supply portion 23 may extend substantially perpendicular to front face 20*a*. Ink supply portion 23 may have a circular end 23*a* positioned the particular distance away from front face 20*a*, and end 23*a* may have an ink supply opening 24 formed at the center thereof.

Ink supply portion 23 may have a cylindrical hole 25 formed therethrough. Hole 25 extends from ink chamber 21 to ink supply opening 24. Hole 25 may comprise a first portion 29 connected to ink supply opening 24 and a second portion 30 connected to ink chamber 21. The diameter of first portion 29 may be less than the diameter of second portion 30. First portion 29 and second portion 30 may be connected via a step surface 31.

A cylindrical seal member 26 may be fitted in first portion 29 of hole 25 adjacent to ink supply opening 24. Seal member 26 may comprise an elastic material, e.g., rubber. When ink cartridge 3 is mounted to mounting portion 4, an ink supply tube 17 may be inserted into hole 25, and seal member 26 may be pressed against an outer surface of ink supply tube 17. Because seal member 26 contacts the outer surface of ink supply tube 17 tightly, ink is prevented from leaking between ink supply tube 17 and hole 25.

A valve disc 27 and a coil spring 28 may be positioned in second portion 30 of hole 25. Coil spring 28 may be positioned closer to ink chamber 21 than valve disc 27 is positioned to ink chamber 21, and valve disc 27 may be urged by coil spring 28 to contact step surface 31. The diameter of valve disc 27 may be greater than the diameter of first portion 29 of hole 25, and may be slightly less than the diameter of second portion 30 of hole 25. Therefore, when valve disc 27 contacts step surface 31, fluid communication between the interior of ink chamber 21 and the exterior of ink cartridge 3 via hole 25 is prevented. When a predetermined amount of force is applied to valve disc 27 against the urging force of coil spring 28, valve disc 27 separates from step surface 31, and fluid communication between the interior of ink chamber 21 and the exterior of ink cartridge 3 via hole 25 is facilitated. For example, when ink supply tube 17 is inserted into hole 28 and pushes valve disc 27 toward ink chamber 21, ink disposed in ink chamber 21 may be supplied to the exterior of ink cartridge 3 via hole 25 and ink supply tube 17.

Front face 20*a* has an upper end connected to the top face of case 20 and a lower end connected to the bottom face of case 20. At least one resilient member, e.g., coil springs 40 and 41, may be positioned on front face 20*a* between ink supply portion 23 and the lower end of front face 20*a*, and may expand and contract in the depth direction of case 20. Coil springs 40 and 41 may have the same shape and may comprise the same conductive metal material. Coil springs 40 and 41 may extend a predetermined distance from front face 20*a* in the depth direction of case 20 away from ink chamber 21, and coil springs 40 and 41 may extend substantially perpendicular to front face 20*a*. Coil springs 40 and 41 may be configured to receive ink which drips from ink supply opening 24. Coil springs 40 and 41 may be separated from each other and may be aligned in the width direction of case 20. Coil springs 40 and 41 may have ends 40*a* and 41*b*, respectively, which are positioned the predetermined distance away from the front face 20*a* in the depth direction of case 20 away from ink chamber 21. Coil springs 40 and 41 may extend from front face 20*a* further than ink supply portion 23 extends from front face 20*a* in the depth direction of case 20 away from ink chamber 21, such that each of ends 40*a* and 41*a* of coil springs 40 and 41 are positioned further from front face 20*a* than end 23*a* of ink supply portion 23 is positioned from front face 20*a*.

Figure 6:
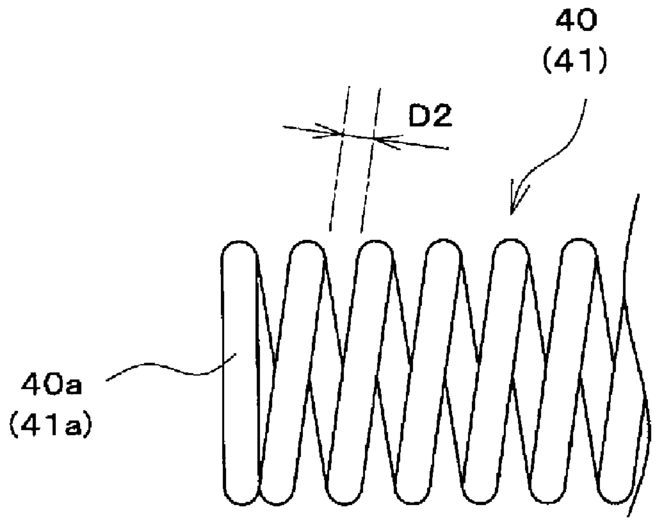
FIG. 6 is a side view of a coil spring of the ink cartridge of FIG. 1.

Referring to FIG. 6, each of coil springs 40 and 41 may be formed by coiling a wire, and each of coil springs 40 and 41 has a central axis and is coiled around the central axis. The central axis may be parallel with the depth direction of case 20. Adjacent portions of each of coil springs 40 and 41 in the central axis direction are separated by a distance D2. Distance D2 may be selected, such that when coils springs 40 and 41 receives ink which dripped from ink supply opening 24, the adjacent portions of coils springs 40 and 41 retain the ink therebetween via a capillary force. Distance D2 may be less than or equal to about 0.5 millimeters.

Referring to FIG. 2(*a*), coil springs 40 and 41 may be positioned symmetrically with respect to a plane which intersects the center of ink supply opening 24, and is perpendicular to the width direction of case 20. Consequently, the midpoint of the line segment which connects the central axes of coil springs 40 and 41 in the width direction may be positioned directly below the center of ink supply opening 24. A distance D1 between coil springs 40 and 41 may be selected, such that when ink drips from ink supply opening 24 and lands between coil springs 40 and 41, coil springs 40 and 41 retain the ink therebetween via a capillary force. Distance D1 may be less than or equal to about 3.0 millimeters.

Referring to FIGS. 2(*b*), 3(*a*), 3(*b*), and 6, each of ends 40*a* and 41*a* of coil springs 40 and 41 may be wound in a direction perpendicular to the depth direction of case 20, such that the terminal end of each of ends 40_a_ and 41_a_ does not protrude in the depth direction of case 20.

Ends of coil springs 40 and 41 opposite ends 40_a_ and 41_a_ are connected to case 20. The ends of coil springs 40 and 41 may be press-fitted in front face 20_a_. Alternatively, when case 20 is injection molded, the ends of coils springs 40 and 41 may be inserted into a mold, and then resin material may be injected into the mold. Ink cartridge 3 may further comprise at least one electrode wire 50, e.g., two electrode wires 50. Ends of electrode wires 50 may be connected to the ends of coil springs 40 and 41, respectively. The other ends of electrode wires 50 reach ink supply chamber 21, respectively. When ink chamber 21 is filled with ink, coil springs 40 and 41 are electrically connected via ink and electrode wires 50. Nevertheless, ink cartridge 3 may not comprise electrode wires 50. Alternatively, the ends of coil springs 40 and 41 reach ink supply portion 21, respectively, and coil springs 40 and 41 may be electrically connected via ink.

Referring to FIGS. 3(_a_) and 3(_b_), a cylindrical ink supply tube 17 may be positioned at closed end surface 14 of mounting portion 4. Closed end surface 14 may comprise a cylindrical recess 16 and ink supply tube 17 extending from the bottom of recess 16 towards the opening of mounting portion 4. When ink cartridge 3 is mounted to mounting portion 4, ink supply portion 23 fits in recess 16, and ink supply tube 17 is inserted into hole 25 via ink supply opening 24. The depth of recess 22 may be greater than or equal to the length of ink supply portion 23 extending from front face 20_a_ to end 23_a_. Ink supply tube 17 may comprise an end surface 17_a_, and a cut-out may be formed in end surface 17_a_.

Mounting portion 4 may comprise an outer surface 13 and joint portion 12 positioned at outer surface 13. Tube 10 may be connected to joint portion 12. A communication hole 15 may be formed through a wall of mounting portion 4, and communication hole 15 is connected to ink supply tube 17 at one end and connected to joint portion 12 at the other end.

Closed end surface 14 may comprise two cylindrical recesses 18 formed therein, and when ink cartridge 3 is mounted to mounting portion 4, coil springs 40 and 41 may be accommodated in recesses 18, respectively. The diameters of recesses 18 may be slightly greater than the outer diameters of coil springs 40 and 41, respectively, and the depths of recesses 18 may be slightly less than or equal to the lengths of coils springs 40 and 41, respectively.

Two electric terminals 19 may be disposed at the bottoms of two recesses 18, respectively. When ink cartridge 3 is mounted to mounting portion 4, ends 40_a_ and 41_a_ of coil springs 40 and 41 contact electric terminals 19, respectively. Electric resistance between electric terminals 19 when ink chamber 21 is includes a sufficient amount of ink is different than electric resistance between electric terminals 19 when ink chamber 21 does not include a sufficient amount of ink. Controller 8 may determine whether ink chamber 21 includes a sufficient amount of ink based on the electric resistance between electric terminals 19.

Ends 40_a_ and 41_a_ of coil springs 40 and 41 may securely contact electric terminals 19, respectively, by the elasticity of coil springs 40 and 41. Therefore, whether ink chamber 21 includes a sufficient amount of ink may be determined accurately.

Figure 5:
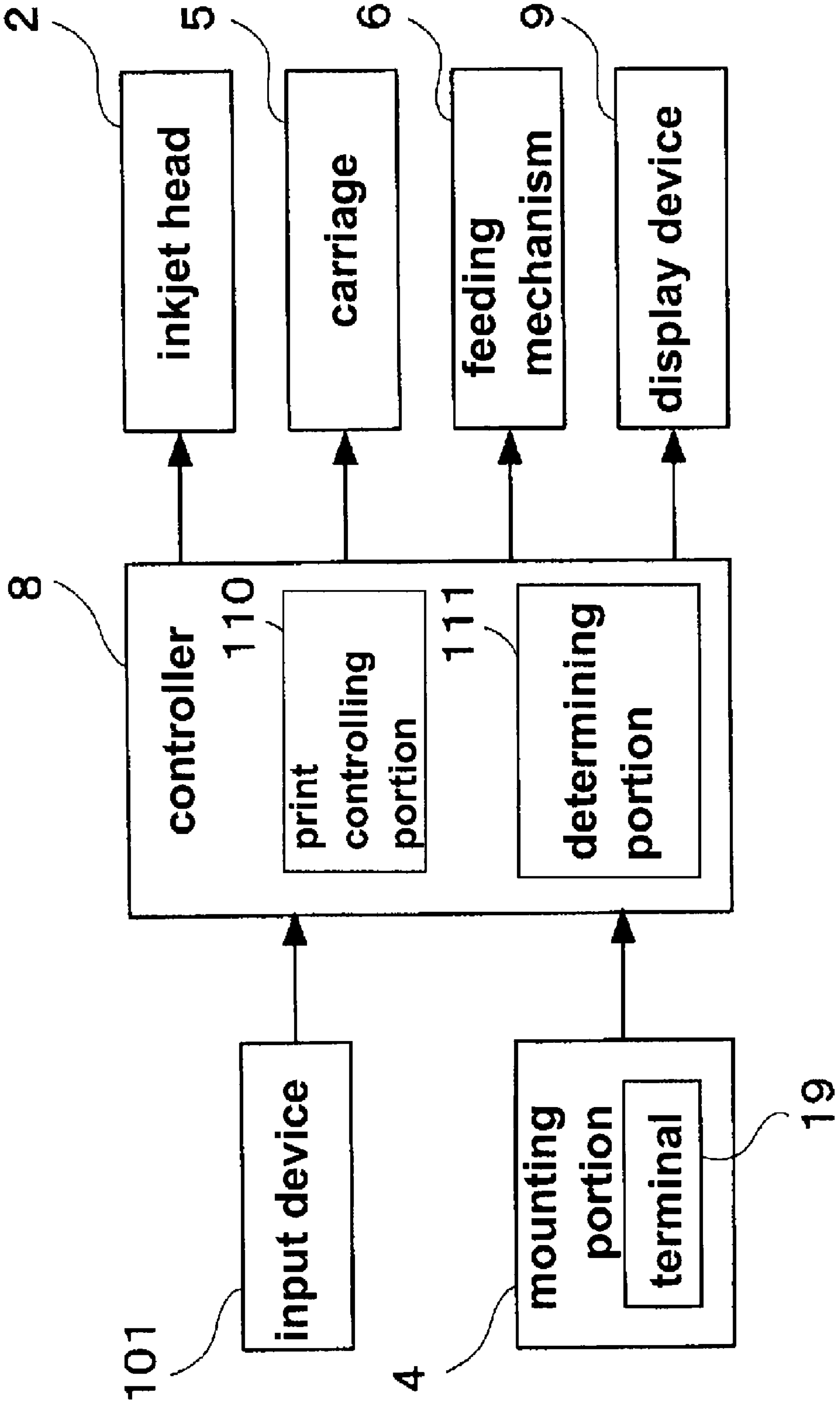
FIG. 5 is a block diagram of a controller of the ink jet printer of FIG. 1.

Referring to FIG. 5, controller 8 may comprise a central processing unit (CPU), a read only memory (ROM), and a random access memory (RAM). CPU may execute programs to control the respective operations of inkjet printer 1. ROM may store programs used by the CPU. RAM may be a storage area or a work area for temporarily storing the respective data used by the CPU for executing the programs.

Controller 8 may comprise a print controlling portion 110 for controlling the printing operation of inkjet printer 1, i.e., for controlling inkjet head 2, carriage 5, feeding mechanism 6, and the like based on data input from an input device 101, e.g., a computer.

Controller 8 may be electrically connected to electric terminals 19. Controller 8 may comprise a determining portion 111 for monitoring the electric resistance between electric terminals 19 and determining whether ink chamber 21 includes a sufficient amount of ink based on the electric resistance. When the electric resistance is less than a predetermined resistance, determining portion 111 may determine that ink chamber 21 includes a sufficient amount of ink, and when the electric resistance is greater than or equal to the predetermined resistance, determining portion 111 may determine that the ink chamber 21 does not include a sufficient amount of ink. Determining portion 111 may also control a display device 9 e.g., a Liquid Crystal Display, a lamp, or the like to indicate whether ink chamber 21 includes a sufficient amount of ink.

Referring to FIGS. 3(_a_) and 3(_b_), the process of mounting ink cartridge 3 to mounting portion 4 and the process of removing ink cartridge 3 from mounting portion 4 are described. When ink cartridge 3 moves from the position depicted in FIG. 3(_a_) to the position depicted in FIG. 3(_b_), ink supply tube 17 is inserted into hole 25, and end surface 17_a_ applies a force against valve disc 27 against the urging force of coil spring 28 to separate valve disc 27 from step surface 31. Ink flows from ink chamber 21 into ink supply tube 17 via a cut-out formed in end surface 17_a_. Ink then flows from ink supply tube 17 to inkjet head 2 via communication hole 15, joint portion 12, and tube 10.

When ink cartridge 3 moves from the position depicted in FIG. 3(_b_) to the position depicted in FIG. 3(_a_), ink supply tube 17 is removed from hole 25, and valve disc 27 is moved by coil spring 28 to contact step surface 31. When valve disc 27 moves to step surface 31, ink may be pushed out of second portion 30 of hole 25 to ink supply opening 24. Moreover, ink adhering to ink supply tube 17 may be transferred to end 23_a_ of ink supply portion 23. Consequently, ink may drip from ink supply opening 24 or end 23_a_ of ink supply portion 23, or both.

Ink which drips from ink supply opening 24 or an end 23_a_ of ink supply portion 23, or both, is received by coil springs 40 and 41. For example, coil spring 40 or coil spring 41, or both, may retain ink between adjacent loops via a capillary force, or coil springs 40 and 41 may retain ink therebetween via a capillary force, or both.

Moreover, if ink cartridge 3 contacts a surface, the impact generated by such contact may be absorbed by coil springs 40 and 41. Therefore, ink cartridge 3 may be prevented from being damaged.

Figure 7:
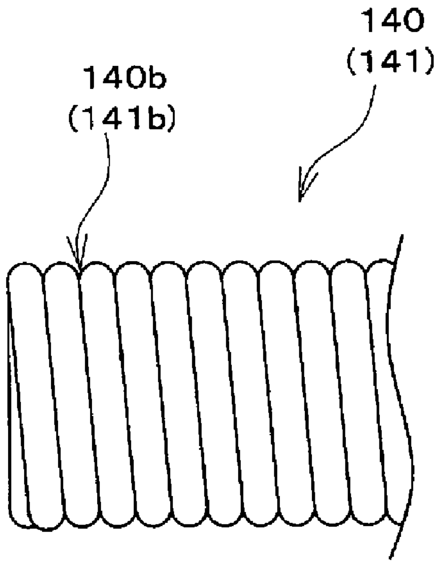
FIG. 7 is a side view of a coil spring of an ink cartridge, according to another embodiment of the present invention.

Referring to FIG. 7, an ink cartridge according to another embodiment of the present invention may comprise coil springs 140 and 141 instead of coil springs 40 and 41. Adjacent loops of each of coil springs 140 and 141 may contact each other without gaps therebetween. Valleys 140_b_ and 141_b_ may be formed between adjacent loops of each of coil springs 140 and 141, respectively. Coil springs 140 and 141 may retain ink within valleys 140_b_ via a capillary force. The greater the diameter of the wire of coil springs 140 and 141, the deeper the valleys 140_b_ and 141_b_, and the deeper valleys 140_b_ and 141_b_ may be configured to retain more ink.

Figure 8:
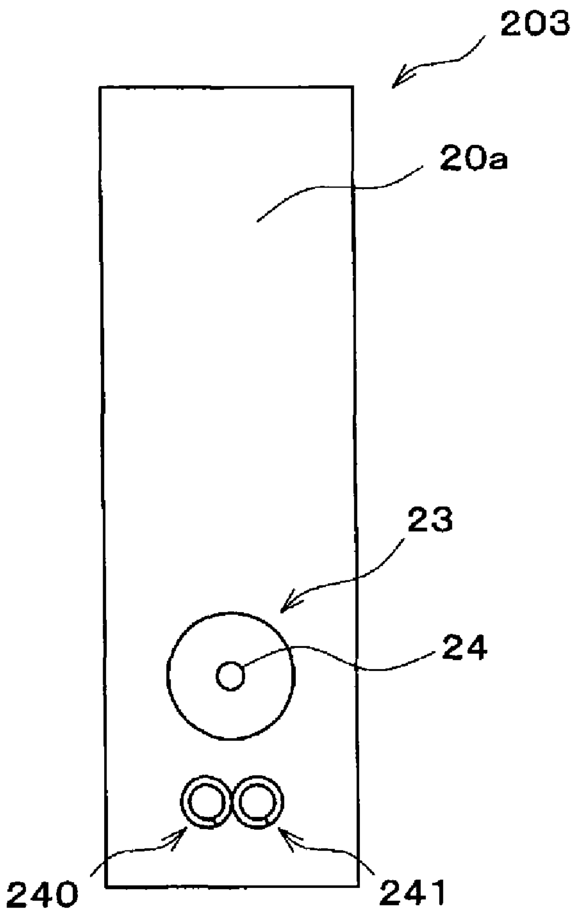
FIG. 8 is a front view of an ink cartridge, according to yet another embodiment of the present invention.

Referring to FIG. 8, an ink cartridge 203 according to yet another embodiment of the present invention may comprise coil springs 240 and 241 instead of coil springs 40 and 41. Coil springs 240 and 241 may be aligned in the width direction of case 20 and may contact each other, such that there is no gap between could springs 240 and 241. Coil springs 240 and 241 may retain ink between adjacent loops of each of coil springs 240 and 241. Coil springs 240 and 241 may be the same type of coil spring as coil springs 40 and 41 or coil springs 140 and 141.

Figure 9:
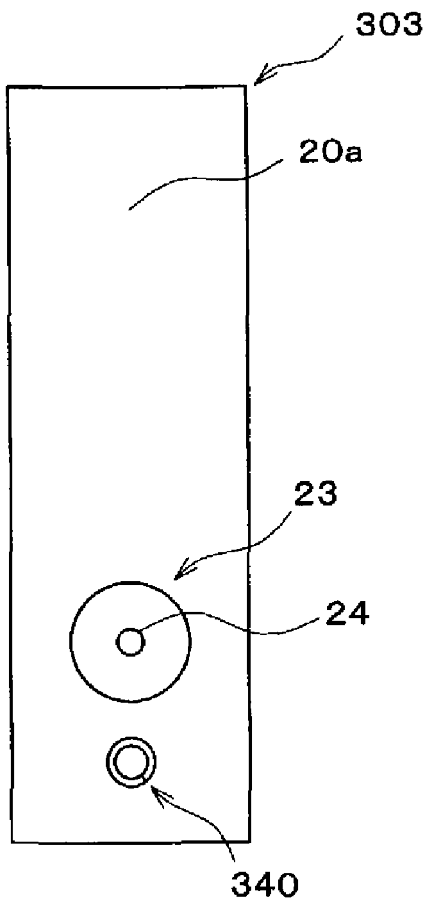
FIG. 9 is a front view of an ink cartridge, according to still another embodiment of the present invention.

Referring to FIG. 9, an ink cartridge 303 according to still another embodiment of the present invention may comprise a single coil spring 340 instead of coil springs 40 and 41. Coil spring 340 is positioned vertically below ink supply portion 23. Coil spring 340 may retain ink between adjacent loops of coil spring 340.

Figure 10:
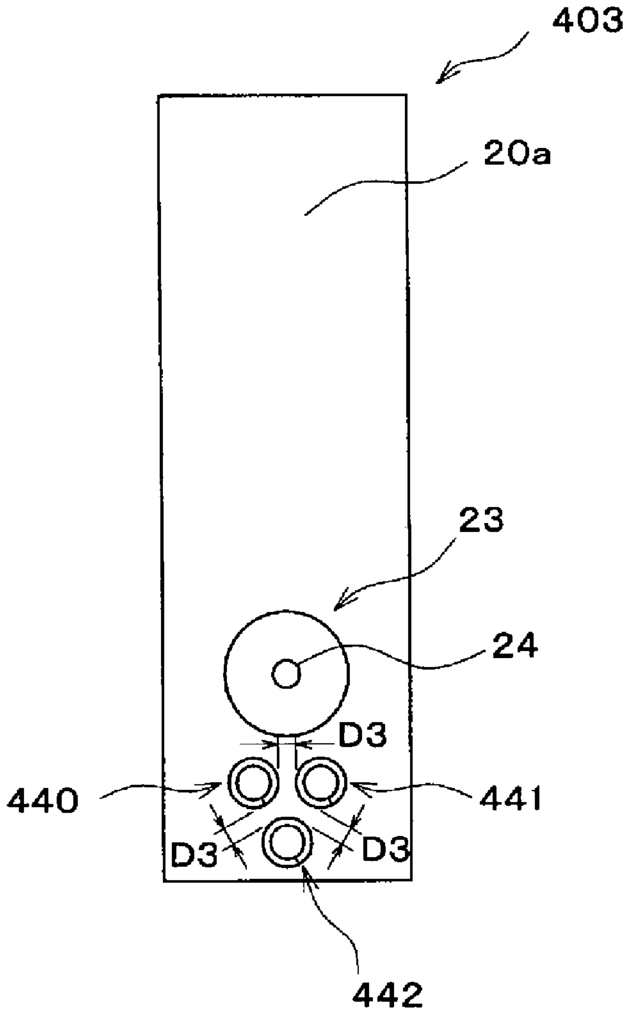
FIG. 10 is a front view of an ink cartridge, according to still yet another embodiment of the present invention.

Referring to FIG. 10, an ink cartridge 403 according to still yet another embodiment of the present invention may comprise three coil springs 440, 441, and 442 instead of coil springs 40 and 41. Coils springs 440 and 441 are positioned between ink supply portion 23 and the lower end of front face 20*a*. Coil springs 440 and 441 may be aligned in the width direction of case 20, and may be positioned symmetrically with respect to a plane which intersects the center of ink supply opening 24 and is perpendicular to the width direction of case 20. Coil spring 442 is positioned between coil springs 440 and 441 and the lower end of front face 20*a*. Coil spring 442 intersects the plane which intersects the center of ink supply opening 24 and is perpendicular to the width direction of case 20. Coil springs 440, 441, and 442 are separated from each other by an equal distance D3. Coil spring 440, coil spring 441, or coil spring 442, or any combination thereof, may retain ink between adjacent loops via a capillary force, or coil springs 440, 441, and 442 may retain ink therebetween via a capillary force, or both.

Figure 11:
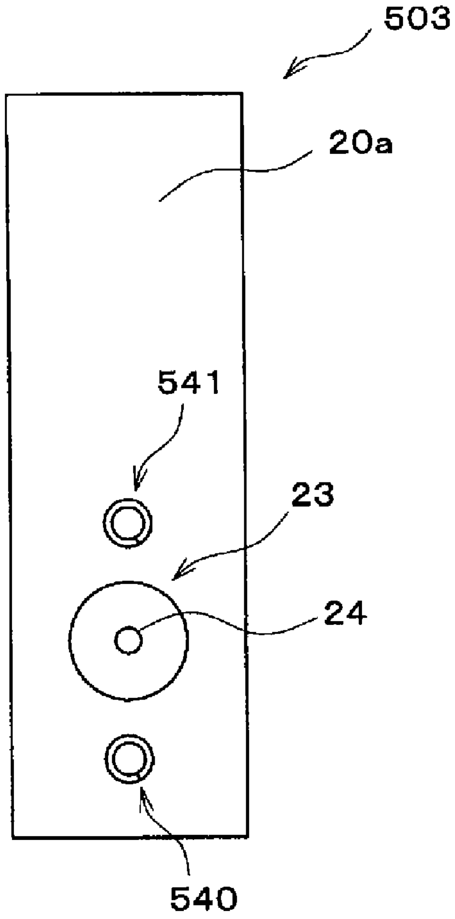
FIG. 11 is a front view of an ink cartridge, according to a further embodiment of the present invention.

Referring to FIG. 11, an ink cartridge 503 according to a further embodiment of the present invention may comprise coil springs 540 and 541 instead of coil springs 40 and 41. Coil spring 540 may be positioned vertically below ink supply portion 23, and coil spring 541 may be positioned vertically above ink supply portion 23. Coil spring 540 may retain ink which drips from ink supply opening 24 or end 23*a* of ink supply portion 23, or both, when ink cartridge 503 is removed from mounting portion 4. Coil spring 541 may retain ink which drips from ink supply opening 24 and or end 23*a* of ink supply portion 23, or both, when ink cartridge 503 is oriented upside down after ink cartridge 503 is removed from mounting portion 4.

Figure 12A:
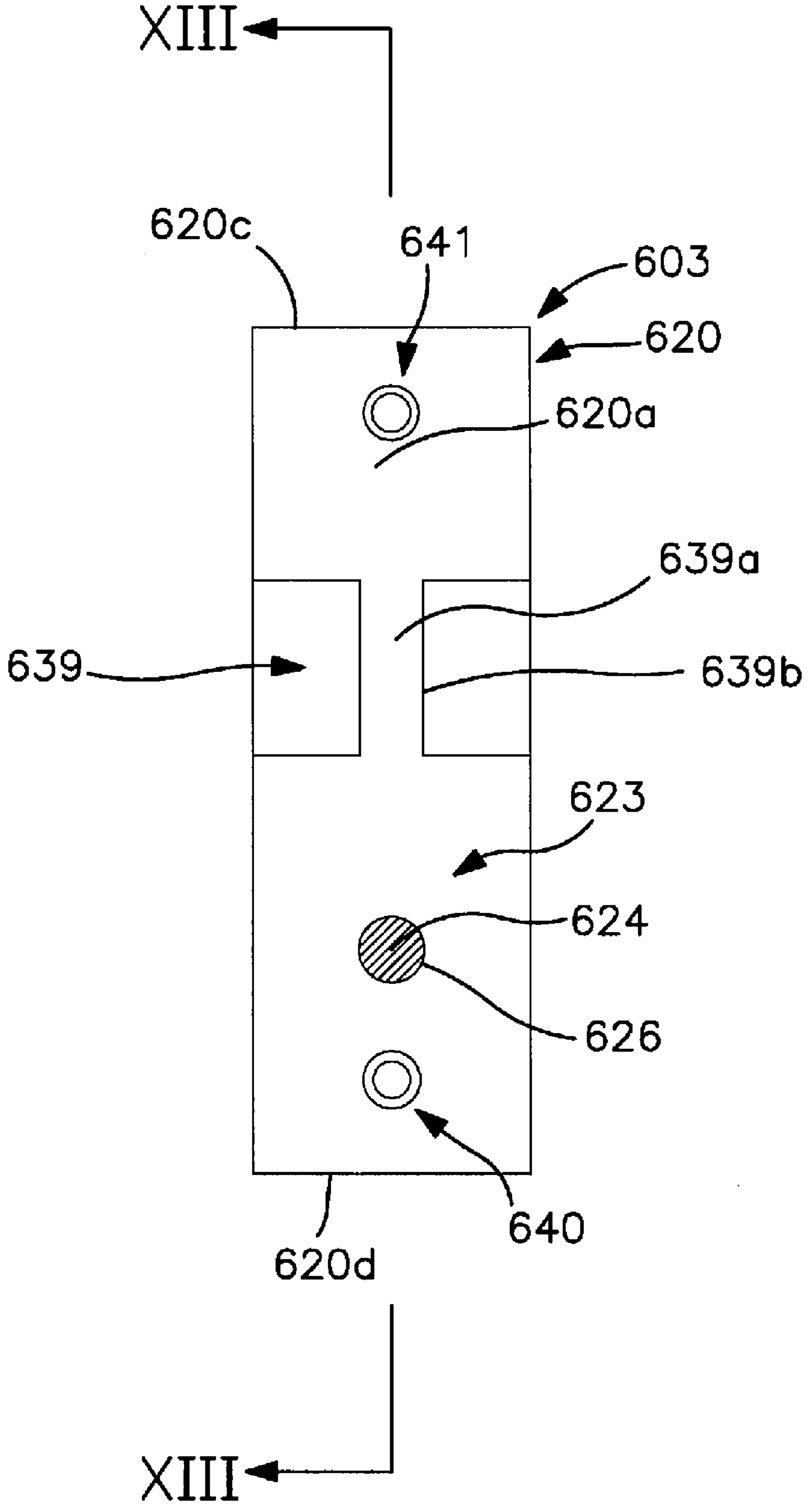
FIG. 12(*a*) is a front view of an ink cartridge, according to yet a further embodiment of the present invention.
Figure 12B:
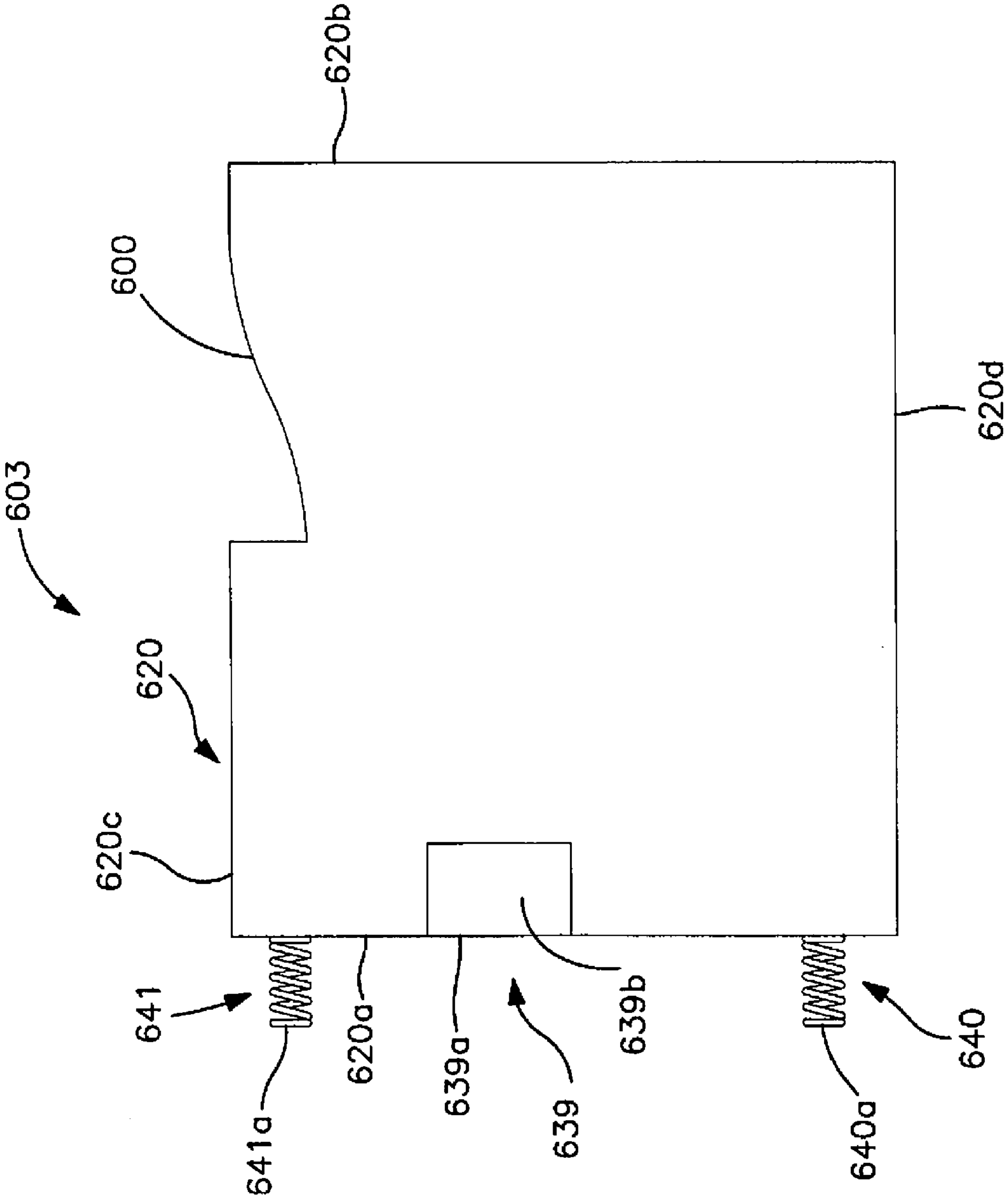

Referring to FIGS. 12(*a*)-13(*b*), an ink cartridge 603 according to yet a further embodiment of the present invention may comprise a case 620 storing ink, and an ink supply portion 623 configured to supply ink from the interior of case 620 to the exterior of case 620. Case 620 may have a substantially rectangular parallelepiped shape having a front face 620*a*, a rear face 620*b* opposite front face 20*a*, a top face 620*c*, a bottom face 620*d* opposite top face 620*c*, a right side face, and a left side face opposite the right side face. Each of top face 620*c* and bottom face 620*d* may be connected to front face 620*a* and rear face 620*b*, and each of the right side face and the left side face may be connected to front face 620*a*, rear face 620*b*, top face 620*c*, and bottom face 620*d*. Front face 620*a*, rear face 620*b*, top face 620*c*, bottom face 620*d*, right side face, and left side face may be substantially parallel to its opposing face, and substantially perpendicular to the other faces. Case 620 may have a depth between front face 620*a* and rear face 620*b*, a height between top face 620*c* and bottom face 620*d*, and a width between the right side face and the left side face. Case 620 may comprise at least one translucent resin material, e.g., a transparent resin material or a semi-transparent resin material, to allow light to pass therethrough. Case 620 may comprise an ink chamber 621 configured to store ink. Ink supply portion 623 may be positioned at front face 620*a*. Top face 620*c* may comprise a latching recess 600 formed therein.

Air intake hole 622 may be formed through rear face 620*b*. Air intake hole 622 may be positioned adjacent to the upper end of rear face 620*b*. Before ink cartridge 603 is used, a sticker (not shown) may be adhered to rear face 620*b* to cover air intake hole 622, and the sticker prevents fluid communication between the interior of ink chamber 621 and the exterior of the ink chamber 621 via air intake hole 622. When a user intends to use ink cartridge 603, the user removes the sticker from rear face 620*b*, and thereby the interior of ink chamber 621 is brought into fluid communication with the exterior of ink chamber 621 via air intake hole 622.

Ink supply portion 623 may have a cylindrical hole 625 formed through a wall of ink cartridge 603, and cylindrical hole 625 extends from front face 620*a* to ink chamber 621 in the depth direction of case 620. A cylindrical seal member 626 may be fitted in hole 625. Seal member 626 may comprise an elastic material, e.g., rubber. Seal member 626 may have a hole 624 formed therethrough. When ink cartridge 603 is not mounted to a mounting portion 604, hole 624 may be closed by the elasticity of seal member 626. When ink cartridge 603 is mounted to mounting portion 604, an ink supply tube 617 may be inserted into hole 624, and seal member 626 may be pressed against an outer surface of ink supply tube 617. Ink disposed in ink chamber 621 may be supplied to the exterior of ink cartridge 603 via ink supply tube 617. Because seal member 626 contacts the outer surface of ink supply tube 617 tightly, ink is prevented from leaking between ink supply tube 617 and hole 624.

Case 620 may comprise a translucent portion 639 positioned at front face 620*a* and extending away from ink chamber 621. Whether ink chamber 621 includes a sufficient amount of ink may be optically or visually detected through the translucent portion 639. Translucent portion 639 may be integral with case 620, and may comprise the same material as case 620, e.g., translucent portion 639 may comprise a translucent resin material to allow light to pass therethrough. Translucent portion 639 may be irradiated with light emitted from a optical sensor 6103. Translucent portion 639 may comprise a front wall 639*a* which is flush with front wall 620*a*, and a pair of side walls 639*b* extending from front wall 639*a* towards ink chamber 621. The width of front wall 639*a* may be less than the width of front face 620*a*.

Translucent portion 639 has an inner space 646 formed therein, which is defined by front wall 639*a* and the side walls 639*b*. Inner space 646 may be configured to be in fluid communication with ink chamber 621, e.g., there may be no wall positioned between inner space 646 and ink chamber 621.

Figure 13A:
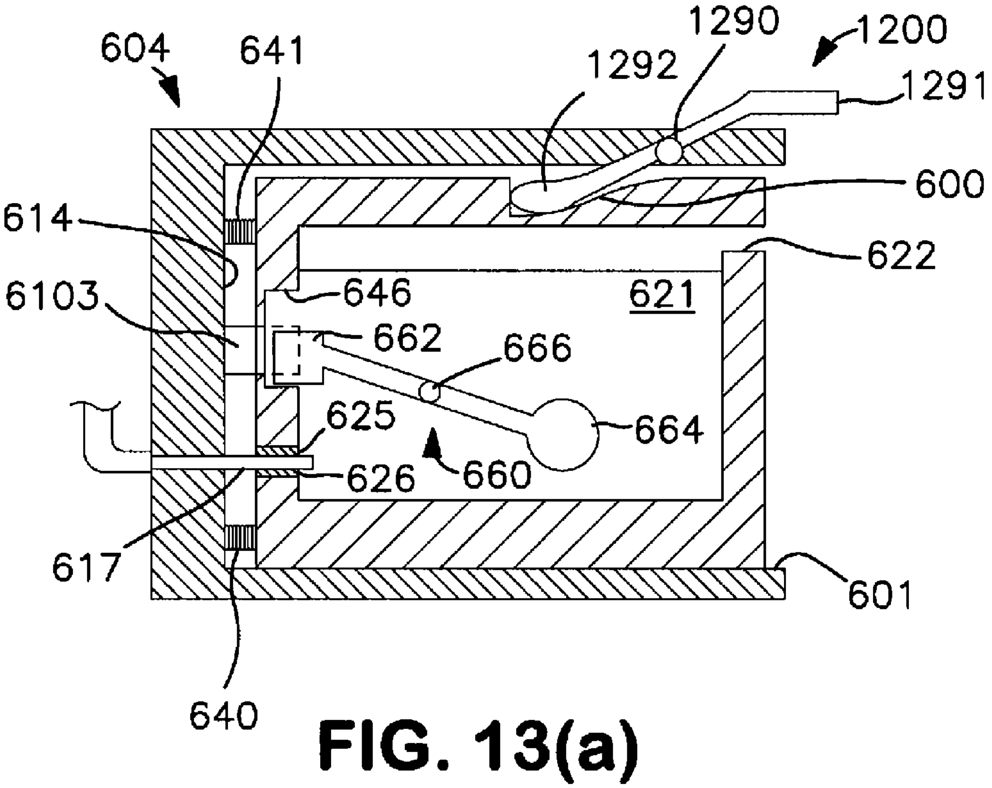
FIG. 13(*a*) is a cross-sectional view of the ink cartridge taken along XIII-XIII line of FIG. 12(*a*) mounted to a mounting portion, according to yet a further embodiment of the present invention when a sufficient amount of ink is stored in the ink cartridge.
Figure 13B:
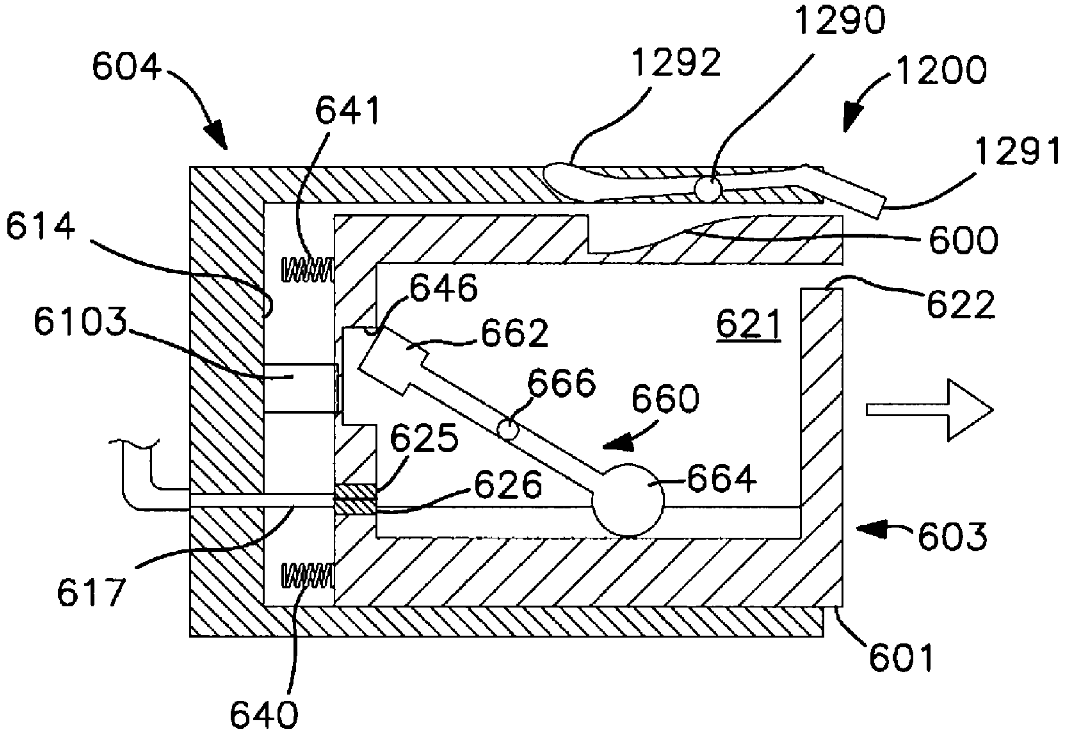

Ink cartridge 603 may comprise a movable member, e.g., a pivotable member 660, disposed in ink chamber 621. Pivotable member 660 may be used in determining whether the amount of ink stored in the ink chamber 621 is greater than or equal to a sufficient amount of ink. Pivotable member 660 may comprise an indicating portion 662 at one end thereof, and a float portion 664 at the other end thereof. Pivotable member 660 also may comprise a shaft 666 positioned between and connected to indicating portion 662 and float portion 664. Shaft 666 extends in the width direction of case 620, and shaft 666 may be supported by supporting portions disposed on inner surfaces of walls defining side faces of case 620, such that pivotable member 660 pivots about shaft 666. Indicating portion 662 may be configured to move between a first position within inner space 646 and a second position, e.g., a position within inner space 646. When indicating portion 662 is at the first position, indicating portion 662 may contact a bottom surface of translucent portion 639 as indicated in FIG. 13(*a*). When indicating portion 662 is at the second position, indicating portion 662 may be separated from the bottom surface of translucent portion 639 as indicated in FIG. 13(*b*).

The specific gravity of float portion 664 may be less than the specific gravity of ink stored in the ink chamber 621. Float portion 664 may have a hollow formed therein, and floats on liquid, such that the float portion 664 moves upward and downward based on the amount of ink within the ink chamber 621, and pivotable member 660 pivots based on the movement of float portion 664. In another embodiment, float portion 664 does not have the hollow formed therein, and comprises a material having a specific gravity less than the specific gravity of ink.

Indicating portion 662 is configured to indicate whether the amount of ink in the ink chamber 621 is greater than or equal to a sufficient amount of ink. When pivotable member 660 pivots counterclockwise in FIGS. 13(*a*) and 13(*b*), indicating portion 662 contacts the bottom surface of translucent portion 639, such that further movement of pivotable member 660 is prevented and indicating portion 662 remains at the first position. When pivotable member 660 pivots clockwise in FIGS. 13(*a*) and 13(*b*), indicating portion 662 moves away from the bottom surface of the translucent portion 639. When float portion 664 contacts a bottom surface of the ink chamber 621, further movement of pivotable member 660 is prevented and indicating portion 662 remains at the second position apart from the bottom surface of translucent portion 639.

Pivotable member 660 may comprise a first portion extending from shaft 666 to indicating portion 662, and a second portion extending from shaft 666 to float portion 664. The mass of the first portion of pivotable member 660 may be less than the mass of the second portion of pivotable member 660. Therefore, the second portion of pivotable member 660 may be heavier than the first portion of pivotable member 660 in air. Accordingly, when the amount of ink in ink chamber 621 approaches an insufficient amount of ink, pivotable member 660 pivots clockwise about shaft 666 in FIGS. 13(*a*) and 13(*b*) and indicating portion 662 separates from the bottom surface of translucent portion 639. When the lower end of float portion 664 contacts the bottom surface of ink chamber 621, pivotable member 660 stops pivoting and the indicating portion 662 remains at the second position. When indicator portion 662 is at the second position, it is determined that ink chamber 621 includes an amount of ink which is less than a sufficient amount of ink.

However, when the amount of ink stored in ink chamber 621 is greater than or equal to a sufficient amount of ink, float portion 664 is submerged in the ink, and a buoyancy force acts on float portion 664. The buoyancy force is sufficient to cause the pivotable member 660 to pivot counterclockwise about shaft 666 in FIGS. 13(*a*) and 13(*b*). When pivotable member 660 pivots counterclockwise, indicating portion 662 contacts the bottom surface of translucent portion 639, and pivotable member 660 stops pivoting and indicating portion 662 remains at the first position. When indicating portion 662 is at the first position, it is determined that the amount of ink stored in ink chamber 621 is greater than or equal to a sufficient amount of ink.

Whether the amount of ink stored in ink chamber 621 is greater than or equal to a sufficient amount of ink may be detected by monitoring the position of indicating portion 662.

Front face 620*a* has an upper end connected to top face 620*c* and a lower end connected to bottom face 620*d*. A coil spring 640 may be positioned on front face 620*a* between ink supply portion 623 and the lower end of front face 620*a*. Translucent portion 639 may be positioned between the upper end of front face 620*a* and ink supply portion 623. A coil spring 641 may be positioned on front face 620*a* between the upper end of front face 620*a* and translucent portion 639. Coil springs 640 and 641 may be substantially the same as coil springs 40 and 41, respectively. Coil springs 640 and 641 and may comprise the same metal material. Coil springs 640 and 641 may be coupled to front face 620*a* at one ends. Specifically, coil springs 640 and 641 may be coupled to front face 620*a* by direct contact between coil springs 640 and 641 and front face 620*a*, or by indirect contact between coil springs 640 and 641 and front face 620*a*, i.e., with at least one other element positioned between coil springs 640 and 641 and front face 620*a*. Coil springs 640 and 641 may extend a predetermined distance from front face 620*a* in the depth direction of case 620 away from ink chamber 621, and may extend substantially perpendicular to front face 620*a*. Coil springs 640 and 641 may intersect a plane which intersects the center of hole 624 and is perpendicular to the width direction of case 620. Coil springs 640 and 641 have ends 640*a* and 641*b*, respectively, which are positioned the predetermined distance away from the front face 620*a* in the depth direction of case 620 away from ink chamber 621. Coil springs 640 and 641 may extend from the front face 620*a* further than ink supply portion 623 in the depth direction of case 620 away from ink chamber 621, such that each of ends 640*a* and 641*a* of coil springs 640 and 641 is positioned further from front face 620*a* than ink supply portion 623 is positioned from front face 620*a*.

Mounting portion 604 may have an opening 601 formed therethrough, and ink cartridge 603 may be inserted and mounted horizontally into the inside of mounting portion 604 through opening 601 in a direction parallel to the depth direction of case 620. Mounting portion may have a closed end surface 614 opposite from opening 601. Ink supply tube 617 extends from closed end surface 614 toward opening 601, and an optical sensor 6103 may be positioned at closed end surface 614. Optical sensor 6103 may be a photo interrupter comprising a light emitting portion and a light receiving portion.

Mounting portion 604 may comprise a lock lever 1200. Lock lever 1200 may comprise a first portion 1291, a second portion 1292, and a pivot portion 1290 between first portion 1291 and second portion 1292. Pivot portion 1290 may be supported at the upper portion of mounting portion 604 adjacent to opening 601, such that lock lever 1290 pivots about pivot portion 1290. First portion 1291 extends from pivot portion 1290 to the outside of mounting portion 604, and second portion 1292 extends from pivot portion 1290 to the inside of mounting portion 604. First portion 1291 may be positioned above second portion 1292 because the weight of first portion 1291 is less than the weight of second portion 1292.

When ink cartridge 603 is mounted to mounting portion 604, front face 620*a* faces closed end surface 614. Ink supply tube 617 may be inserted through hole 624 of seal member 626, and ink may be supplied from ink chamber 621 to inkjet head 2 via ink supply tube 17. Translucent portion 639 is positioned between the light emitting portion and the light receiving portion of optical sensor 6103, such that the pair of side walls 639*b* face the light emitting portion and the light receiving portion, respectively. Depending on the position of indicating portion 662 in translucent portion 639, the intensity of light received by the light receiving portion varies. Based on the intensity of light received by the light receiving portion, it may be determined whether the amount of ink in the installed ink cartridge 603 is greater than or equal to a sufficient amount of ink.

During insertion of ink cartridge 603 to mounting portion 604, ends 640*a* and 641*a* of coil springs 640 and 641 contact closed end surface 614. When ink cartridge 603 is further inserted, coil springs 640 and 641 contract, and a portion of second portion 1292 of lock lever 1200 contacts a portion of latching recess 600. Case 620 receives the urging force of coil springs 640 and 641 toward opening 601. Nevertheless, because the portion of second portion 1292 contacts the portion of the latching recess 600 to retain case 620 against the urging force of coil springs 640 and 641, ink cartridge 603 remains in mounting portion 604.

When a user intends to remove ink cartridge 603 from mounting portion 604, the user applies a downward force to an end portion of first portion 1291. Lock lever 1200 then pivots about pivot portion 1290, as shown in FIG. 13(*b*), and second portion 1292 moves up and separates from latching recess 600. Consequently, coil springs 640 and 641 expand, and ink cartridge 603 is partially ejected from mounting portion 604. The user then grasps the rear portion of ink cartridge 603 and removes ink cartridge 603 from mounting portion 604. Thus, ink cartridge 603 readily may be removed from mounting portion 604.

Coil spring 640 may retain ink which drips from hole 624 of seal member 626 when ink cartridge 603 is removed from mounting portion 604. Coil spring 641 may retain ink which drips from hole 624 of seal member 626 when ink cartridge 603 is oriented upside down after ink cartridge 603 is removed from mounting portion 604.

Moreover, if ink cartridge 603 contacts a surface, coil springs 640 and 641 may contact the surface, but the impact of such contact may be absorbed by coil springs 640 and 641. Therefore, ink cartridge 3 may be prevented from being damaged. In particular, ink supply portion 623 and translucent portion 639 are protected by coil springs 640 and 641.

In an embodiment, ink cartridge 603 may comprise leaf springs instead of coil springs 640 and 641. Leaf springs 640 and 641 also may allow ink cartridge 603 to be partially ejected from mounting portion 604. Leaf springs also may catch ink which drips from hole 624 of seal member 626. Moreover, ink cartridge 603 may comprise rubber springs instead of coil springs 640 and 641.

Figure 14:
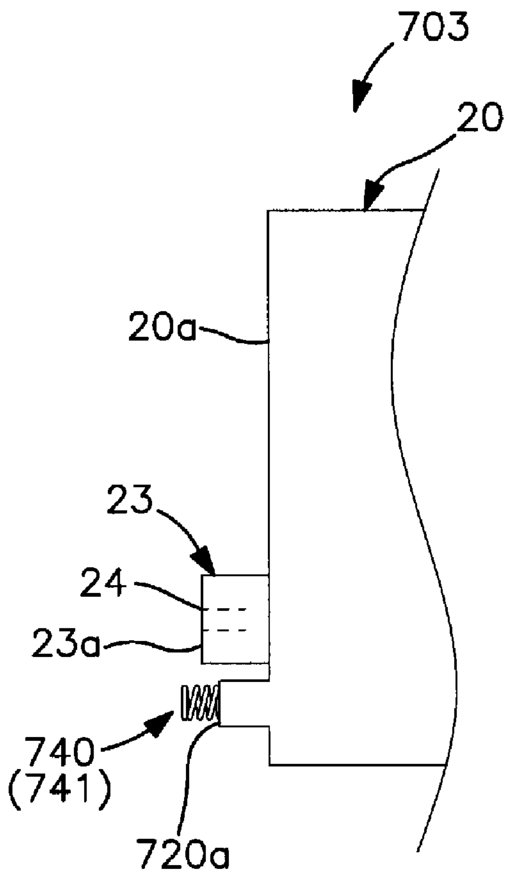
FIG. 14 is a partial, side view of an ink cartridge, according to still a further embodiment of the present invention.

Referring to FIG. 14, an ink cartridge 703 according to still a further embodiment is depicted. Ink cartridge 703 may be similar to ink cartridge 3, however, front face 20*a* of ink cartridge 703 may comprise a raised portion 720*a* which is raised with respect to an adjacent portion of front face 20*a* in the depth direction of case 20 away from ink chamber 21. Coil springs 740 and 741 may extend from raised portion 720*a* in the depth direction of case 20. Although the length of each of coil springs 740 and 741 may be less than the length of each of coil springs 40 and 41, coil springs 740 and 741 may extend from front face 20*a* further than ink supply portion 23 extends from front face 20*a* in the depth direction of case 20 away from ink chamber 21.

Figure 15:
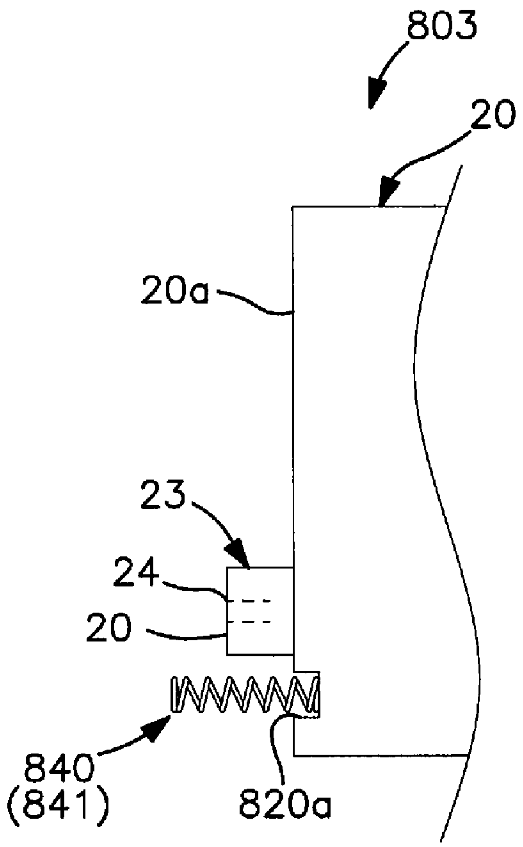
FIG. 15 is a partial, side view of an ink cartridge, according to still another embodiment of the present invention.

Referring to FIG. 15, an ink cartridge 803 according to still another embodiment is depicted. Ink cartridge 803 may be similar to ink cartridge 3, however, front face 20*a* of ink cartridge 803 may have a recess 820*a* formed therein. Coil springs 840 and 841 may extend from the bottom of recess 820*a* in the depth direction of case 20. The length of each of coil springs 840 and 841 may be greater than the length of each of coil springs 40 and 41. Coil springs 840 and 841 may extend from front face 20*a* further than ink supply portion 23 extends from front face 20*a* in the depth direction of case 20 away from ink chamber 21.

While the invention has been described in connection with embodiments of the invention, it will be understood by those skilled in the art that variations and modifications of the embodiments described above may be made without departing from the scope of the invention. Other embodiments will be apparent to those skilled in the art from a consideration of the specification or from a practice of the invention disclosed herein. It is intended that the specification and the described examples are consider exemplary only, with the true scope of the invention indicated by the following claims.

What is claimed is:

1. An ink cartridge, comprising:

a case comprising a front face and a rear face opposite the front face, wherein the case has at least a portion of an ink chamber defined therein, and the ink chamber is configured to store ink therein;

an ink supply portion positioned at the front face of the case, wherein the ink supply portion is configured to dispense ink from an interior of the ink chamber to an exterior of the ink chamber;

an air intake portion positioned at the case, wherein the air intake portion is configured to draw air into the ink chamber; and at least one resilient member having a first portion positioned at the front face of the case and a second portion which is positioned a predetermined distance away from the front face of the case in a predetermined direction away from the ink chamber, wherein the resilient member extends from the front face of the case further than the ink supply portion in the predetermined direction, and wherein the resilient member is configured to expand and to contract along the predetermined direction.

2. The ink cartridge of claim 1, wherein the ink supply portion extends from the front face of the case in the predetermined direction.

3. The ink cartridge of claim 2, wherein the ink supply portion comprises an end positioned a particular distance away from the front face of the case in the predetermined direction, and an ink supply opening formed at the end of the ink supply portion, wherein the resilient member extends from the front face of the case further than the end of the ink supply portion in the predetermined direction.

4. The ink cartridge of claim 1, wherein the front face of the case has at least one recess formed therein, and the first portion of the at least one resilient member is positioned within the at least one recess.

5. The ink cartridge of claim 1, further comprising:

a translucent portion positioned at the front face of the case, wherein the translucent portion extends away from the ink chamber, and has an inner space formed therein, wherein the inner space is configured to be in fluid communication with the ink chamber; and a movable member positioned within the inner space, wherein the movable member is configured to move within the inner space based on an amount of ink in the ink chamber.

6. The ink cartridge of claim 1, wherein the case further comprises a top face connected to each of the front face and the rear face, and the top face has a latching recess formed therein.

7. The ink cartridge of claim 5, wherein the case further comprises a top face connected to each of the front face and the rear face, and the top face has a latching recess formed therein.

8. The ink cartridge of claim 3, wherein the at least one resilient member comprises a coil spring, and the case further comprises a bottom face connected to each of the front face and the rear face, wherein the coil spring is positioned between the ink supply portion and the bottom face.

9. An ink cartridge, comprising:

a case comprising a front face and a rear face opposite the front face, wherein the case has at least a portion of an ink chamber defined therein, and the ink chamber is configured to store ink therein;

an ink supply portion positioned at the front face of the case, wherein the ink supply portion is configured to dispense ink from an interior of the ink chamber to an exterior of the ink chamber;

an air intake portion positioned at the case, wherein the air intake portion is configured to draw air into the ink chamber; and a first resilient member and a second resilient member each having a first portion positioned at the front face of the case and a second portion which is positioned a predetermined distance away from the front face of the case in a predetermined direction away from the ink chamber, wherein the first resilient member and the second resilient member extend from the front face of the case further than the ink supply portion in the predetermined direction, and wherein the first resilient member and the second resilient member are configured to expand and to contract in a same direction as each other.

10. The ink cartridge of claim 9, wherein the ink supply portion is positioned between the first resilient member and the second resilient member.

11. The ink cartridge of claim 10, further comprising:

a translucent portion positioned at the front face of the case between the second resilient member and the ink supply portion, wherein the translucent portion extends away from the ink chamber, and has an inner space formed therein, wherein the inner space is configured to be in fluid communication with the ink chamber; and a movable member positioned within the inner space, wherein the movable member is configured to move within the inner space based on an amount of ink in the ink chamber.

12. An ink cartridge, comprising:

a case comprising a front face and a rear face opposite the front face, wherein the case has at least a portion of an ink chamber defined therein, and the ink chamber is configured to store ink therein;

an ink supply portion positioned at the front face of the case, wherein the ink supply portion is configured to dispense ink from an interior of the ink chamber to an exterior of the ink chamber;

an air intake portion positioned at the case, wherein the air intake portion is configured to draw air into the ink chamber; and at least one resilient member having a first portion positioned at the front face of the case, and a second portion which is positioned a predetermined distance away from the front face of the case in a predetermined direction, wherein the resilient member extends from the front face of the case further than the ink supply portion in the predetermined direction, wherein the resilient member is configured to expand and to contract along the predetermined direction, and wherein the first portion of the at least one resilient member is unaligned with each of the ink supply portion and the air intake portion in the predetermined direction.

13. A system comprising:

an ink cartridge comprising:

a case comprising a front face and a rear face opposite the front face, wherein the case has at least a portion of an ink chamber defined therein, and the ink chamber is configured to store ink therein;

an ink supply portion positioned at the front face of the case, wherein the ink supply portion is configured to dispense ink from an interior of the ink chamber to an exterior of the ink chamber; a first conductive coil spring having a first portion positioned at the front face of the case, and a second portion which is positioned a predetermined distance away from the front face of the case in a predetermined direction, wherein the first conductive coil spring is configured to be electrically connected to ink in the ink chamber; and a second conductive coil spring having a first portion positioned at the front face of the case, and a second portion which is positioned a predetermined distance away from the front face of the case in the predetermined direction, wherein the second conductive coil spring is configured to be electrically connected to ink in the ink chamber; and an inkjet printer comprising:

a first electric terminal configured to contact the first conductive coil spring;

a second electric terminal configured to contact the second conductive coil spring; and a determining portion configured to determine an amount of ink disposed in the ink chamber based on an electric resistance between the first electric terminal and the second electric terminal.

14. The system of claim 13, wherein the ink cartridge further comprises:

a first conductive wire connected to the first conductive coil spring and extending from the first conductive coil spring to the ink chamber; and a second conductive wire connected to the second conductive coil spring and extending from the second conductive coil spring to the ink chamber.

* * * * *